June 17, 1924.
A. RUETSCHI ET AL
1,498,205
MIXING FAUCET
Filed July 29, 1921
2 Sheets-Sheet 1
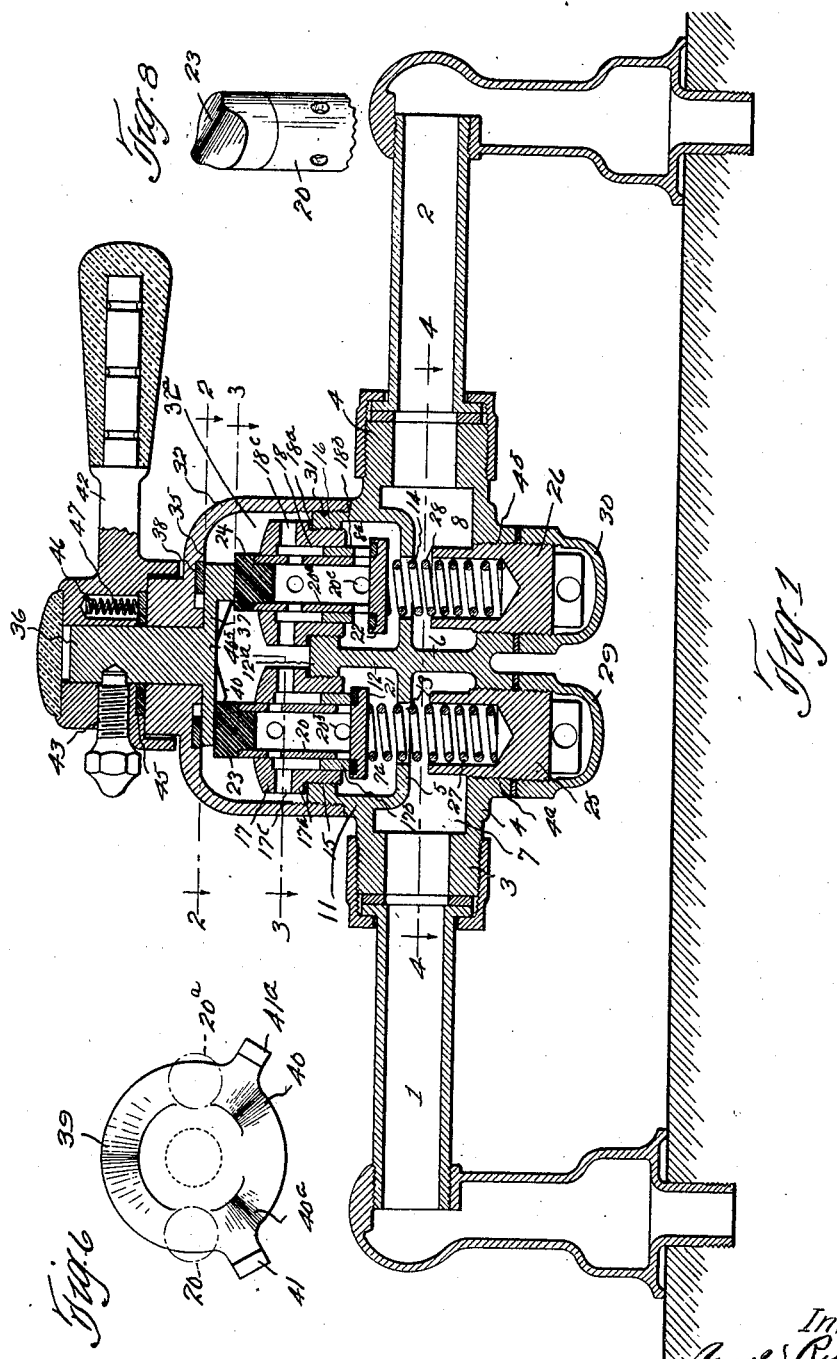

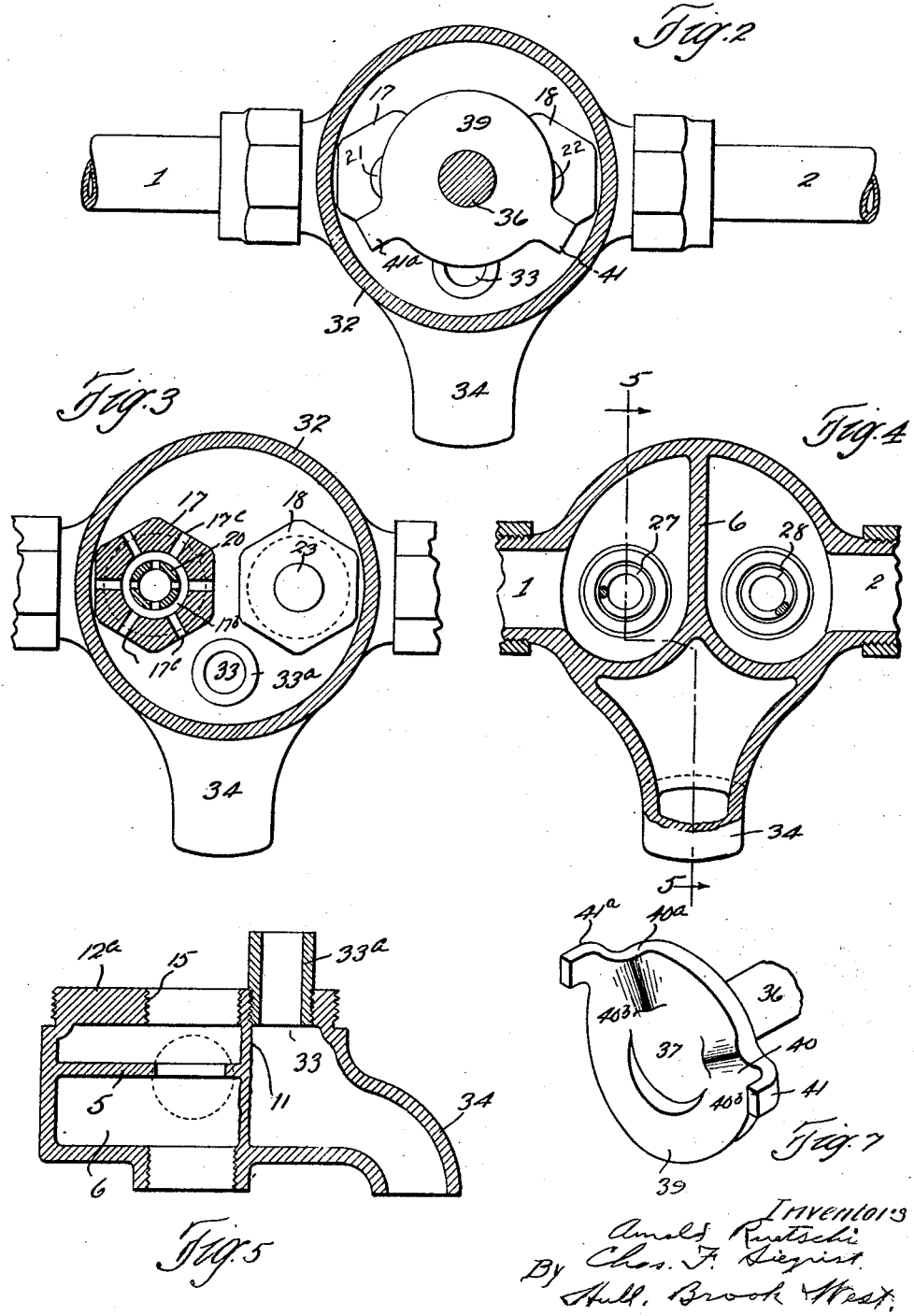

Patented June 17, 1924.

1,498,205

UNITED STATES PATENT OFFICE.

ARNOLD RUETSCHI AND CHARLES F. SIEGRIST, OF LAKEWOOD, OHIO; SAID RUETSCHI ASSIGNOR TO SAID SIEGRIST.

MIXING FAUCET.

Application filed July 29, 1921. Serial No. 488,270.

*To all whom it may concern:*

Be it known that we, ARNOLD RUETSCHI and CHARLES F. SIEGRIST, citizens of the United States, residing at Lakewood, in the county of Cuyahoga and State of Ohio, have invented a certain new and useful Improvement in Mixing Faucets, of which the following is a full, clear, and exact description, reference being had to the accompanying drawings.

This invention relates to mixing faucets, and has for its general object to provide a faucet of this character which will enable the operator, by rotating a faucet handle in either direction from "off" position, to draw first warm water from a faucet common to both the cold and the hot water pipe of a sink, bathtub, or other fixture and, by further rotation of the faucet handle in one direction or the other, to cut off either the hot or the cold water, leaving only the cold or the hot water as the case may be. For instance, if the faucet handle be turned toward the cold water side of the faucet, both hot and cold water will be turned on simultaneously to the mixing chamber, with the result that warm water will be delivered from such chamber. Further rotation of the handle in the same direction will cut off the hot water and progressively increase the supply of cold water to said chamber. On the other hand, if the faucet handle be turned in the opposite direction, hot and cold water will both be delivered to the mixing chamber, while further rotation of the handle in this direction will cut off the cold water and progressively increase the supply of the hot water to said chamber.

A further object of the invention is to provide a valve construction wherein the individual valves which control the admission of cold and hot water to the mixing chamber may be conveniently and efficiently operated for the purpose of varying the proportions of the hot and cold water to the common mixing chamber with which the faucet communicates. A still further object of the invention is to improve the construction of faucets of this character and of the valves therefor. We accomplish the foregoing general objects, as well as others which will be pointed out hereinafter, in and through the construction and arrangement of parts shown in the drawings forming part hereof wherein Fig. 1 represents a longitudinal sectional elevation through the hot and cold water pipe connections and our mixing faucet, showing one of the valve members in open and the other in closed position; Figs. 2, 3 and 4 are sectional views corresponding respectively to the lines 2—2, 3—3 and 4—4 of Fig. 1, the valves in Fig. 2 however being both closed; Fig. 5 is a sectional plan view corresponding to the line 5—5 of Fig. 4; Fig. 6 is a detail in bottom plan and Fig. 7 is a detail in perspective of the cam plate for operating the individual valves of our device; and Fig. 8 is a detail in perspective of one of the valves.

Describing the various parts by reference characters, 1 denotes a hot water pipe and 2 a cold water pipe connecting with opposite sides of the bottom section of a faucet casing. This bottom section provides diametrically opposed connections 3 and 4 for the pipes 1 and 2, respectively, with a horizontal bottom plate 4 and a horizontal upper plate 5, said plates being connected by a transverse rib 6, there being receiving chambers, 7 and 8, one on each side of the rib 6.

The bottom plate 4 is provided with a pair of diametrically opposed vertical internally threaded connections, indicated at $4^a$ and $4^b$ on opposite sides of the rib 6. The upper ends of these connections are preferably flush with the bottom plate 4.

Projecting upwardly from the periphery of the disk 5 is an annular flange 11, said flange forming, with an upper transverse rib 12 and a cover plate or wall $12^a$, a pair of chambers $7^a$ and $8^a$ each communicating through a port 13 and 14, respectively, with the chambers 7 and 8, respectively. The wall $12^a$ is provided with diametrically opposed threaded openings 15 and 16, into each of which is threaded an outer hooded valve guide, indicated at 17 and 18 respectively and each having a flange (indicated at $17^a$ and $18^a$) adapted to engage the top of the plate $12^a$. Into the bottom of each sleeve 17, 18 is fitted a tubular bronze valve seat proper, as indicated at $17^b$ and $18^b$.

Slidably mounted in the tops of the guides 17 and 18 and in the tubular seats 17$^b$, 18$^b$, are the valves which control the flow of liquid from the chambers 7, 7$^a$, 8 and 8$^a$ to the mixing chamber 32$^a$ above the plate 12$^a$. Each valve comprises a tubular stem, indicated at 20 and 20$^a$, respectively, and each having openings 20$^b$, 20$^c$ therethrough adapted to receive water flowing above its valve proper and to deliver the same through the openings 17$^c$, 18$^c$. Each valve proper comprises a disk 21, 22 connected to its appropriate stem 20, 20$^a$. The bottom of each disk projects beyond the appropriate seat portion 17$^b$, 18$^b$, and is provided with a suitable packing ring adapted to engage such seat. In the upper end of each of the stems 20, 20$^a$ there is fitted an operating plug, preferably of hard rubber and indicated at 23 and 24, adapted to be engaged by cam projections on a cam plate to be described hereinafter.

Projecting below the bottom plate 4 are the internally threaded connections 4$^a$, 4$^b$, each adapted to receive a plug 25, 26 respectively, said plugs being hollow and each provided with a seat for the reception of a spring, indicated at 27, 28 respectively, the upper ends of said springs bearing respectively against the valves 21 and 22 and normally assisting the water pressure in the chambers 7$^a$ and 8$^a$ in holding the said valves seated. Each of these plugs is of such length as to enable it to be projected into and adjusted across the chambers 7 and 8 respectively, thereby to vary as desired the size of the passageways between the lower and upper chambers and accordingly the proportions between the hot and cold water entering the chambers 7$^a$ and 8$^a$. Threaded on the bottoms of the plugs 25 and 26 are the caps 29, 30 respectively.

The outer edge of the plate 12$^a$ is threaded as shown at 31, to receive the internally threaded lower end of the upper section 32 of the faucet casing. This upper section forms with the plate or wall 12$^a$ a mixing chamber 32$^a$ from which the liquid supplied through either or both of said valves may be discharged through an outlet 33 to the faucet spout 34.

The casing 32 is provided beneath its top with a flat seat 35 and with a central opening, which central opening is adapted to receive the stem 36 of a cam plate, indicated generally at 37. This cam plate is generally circular in outline, its upper surface being shaped to conform to the seating portion 35 therefor, which seating portion includes an annular packing ring 38 in a recess therein.

For convenience of description, that part of the assembly from which the faucet spout 34 projects will be referred to as the "front". The cam plate is provided with an elongated segmental main cam 39, nearly 180° in extent, and a pair of auxiliary cams 40, 40$^a$, each located adjacent to an end of the main cam, with a neutral space 40$^b$ therebetween and each located adjacent to a stop projection 41, 41$^a$, respectively.

In operation, the cam plate will be inserted into the upper casing section 32 before the same is threaded onto the lower section and will be arranged so that, when the valves are closed, the elongated main cam 39 will be at the rear and midway between the valves 21 and 22, while the cams 40, 40$^a$ will be at the front of the said valves, respectively. An operating handle 42 is connected to the stem 36, as by means of a threaded pin 43. By rotating this handle to the right, the cam projection 39 will engage the stem of the hot water valve 21 and the right hand cam 40 at the same time will engage the stem of the cold water valve 22. The hot and cold water valves will be opened proportionately until the lowest spot on the cam 40 engages the stud 24 of the valve 22, when the maximum quantity of cold water for this direction of turning will be delivered through the valve 22 to mix with the hot water. By further rotation in the right-hand direction, the cam 40 will ride off the valve stud 24 and the valve 22 will then close. During this short movement, the supply of cold water will quickly decrease while the supply of hot water will gradually increase, after which only hot water will flow into the mixing chamber. By the time the deepest point of the cam 39 is in engagement with the stud 23, the stop 41 will have engaged the stop projection, which, as shown, is provided by an overflow nipple 33$^a$ threaded into the delivery outlet 33 and providing a non-draining mixing chamber 32$^a$, since the nipple projects above the bottom of the chamber.

Reference has been made heretofore to the use of hard rubber for the operating plugs or extensions 23 and 24 of the valve stems 20. It has been found that this material not only stands up under long and frequent usage but that it does not score the operating parts of the cams.

The bottom of the hub of the handle 42 is provided with an annular recess surrounding the stem 36 in which there is placed an annular packing ring 45, bearing on the flattened top of the neck of the casing section 32. This packing ring is held in place and the handle is retained in any position to which it may be turned by means of a plurality of springs 46, each mounted in an upwardly extending chamber 47 in said hub.

By rotating the handle 42 in the reverse direction, the hot water valve will be operated by the cam 40 and the cold water valve by the cam 39 in the same manner that these cams respectively operated the cold water valve and the hot water valve in the preceding operation, rotation in the right-hand direction being finally checked by the engagement of the stop 41ª with the nipple 33ª, at which time the maximum flow of cold water will be delivered from the spout 34.

In the operation of the faucet, it will be evident that warm water will be delivered therefrom, irrespective of the direction of rotation of the handle 42 from its neutral position, and that further rotation of the handle in the appropriate direction will cause the temperature of the warm water to be increased or reduced, and the faucet finally will deliver its maximum capacity of hot or cold water.

The construction and arrangement of the faucet enables the parts thereof to be conveniently assembled and disassembled; enables the proportions of the hot and cold water supplied to the valves to be varied conveniently, in addition to the variation accomplished by the valves themselves; and the construction as a whole is particularly well adapted for all of the ordinary incidents of use.

Having thus described our invention, what we claim is:

1. A faucet comprising a casing, a hot and a cold water connection communicating with said casing, a valve controlling the flow of water from each connection to a mixing chamber, and means for opening said valve, said means comprising a rotary plate mounted in operative relation to said valves and having an elongated main cam adapted to operate one valve or the other, in accordance with its direction of rotation from neutral position, and a pair of short auxiliary cams, each located adjacent to the end of said elongated cam and each adapted to operate one only of said valves said auxiliary cams being spaced apart to form a low section on the plate diametrically opposite the high point of the main cam.

2. A faucet comprising a casing have a hot and a cold water connection, a valve controlling the flow of water from each connection to a mixing chamber, and means for opening said valve, said means comprising a rotary plate mounted in operative relation to said valves and having a main cam arranged between said valves and adapted to operate one or the other, in accordance with its direction of rotation from neutral position, and a pair of short auxiliary cams, each adapted and arranged to operate the valve which is not being operated by said main cam said auxiliary cams being spaced apart to form a low section on the plate diametrically opposite the high point of the main cam.

3. A faucet comprising a casing having a mixing chamber, a hot and a cold water connection communicating with said casing, a valve controlling the flow of water from each connection to the mixing chamber, and means for opening said valves, said means comprising a rotary member adapted by rotation in one direction to admit hot and cold water simultaneously and proportionately to the mixing chamber and, by further rotation in the same direction, to cut off the cold water and admit hot water only in increasing quantity to said chamber; also, by movement in the reverse direction, to admit hot and cold water simultaneously and proportionately to the mixing chamber and, by further rotation in such direction, to cut off the hot water and admit cold water only in increasing quantity to the mixing chamber.

4. A faucet comprising a casing having a mixing chamber, a hot and a cold water connection communicating with said casing, a valve controlling the flow of water from each connection to the mixing chamber, and means for opening said valves, said means comprising a rotatable member adapted to operate each of said valves alone as well as in conjunction with the other, the said mixing chamber having an elevated outlet, and stops on said member cooperating with said outlet.

5. A mixing faucet comprising a casing having a bottom wall, a wall above and spaced from the bottom wall, and a pair of chambers between said walls, a hot water connection and a cold water connection communicating with said chambers, respectively, the second wall having openings therethrough communicating with said chambers respectively and with chambers above the said wall, a valve seat sleeve in each of the last mentioned chambers, an upwardly seating valve cooperating with each seat and having an operating stem extending above the sleeve therefor, a cam plate rotatably mounted in the upper part of the casing and having thereon cams for operating said valves singly or in unison, the bottom wall having a pair of openings, and a plug for each of the last mentioned openings and adjustable toward and from the second wall whereby the width of the passageways leading from the first mentioned chamber to the second mentioned chamber may be varied.

6. A mixing faucet comprising a casing having a bottom wall, a wall above and spaced from the bottom wall, and a pair of chambers between said walls, a hot water connection and a cold water connection communicating with said chambers, respectively, the second wall having openings therethrough communicating with said chambers respectively and with chambers above the said wall, a valve seat sleeve in each of the last mentioned chambers, an upwardly seating valve cooperating with each seat and having an operating stem, means for operating said stems, and a plug for each of the last mentioned openings and adjustable toward and from the second wall whereby the width of the passageways leading from the first mentioned chamber to the second mentioned chamber may be varied.

In testimony whereof, we hereunto affix our signatures.

ARNOLD RUETSCHI.
CHARLES F. SIEGRIST.